(12) United States Patent
Asada et al.

(10) Patent No.: US 6,609,509 B2
(45) Date of Patent: Aug. 26, 2003

(54) LPG-ENGINE FUEL CONTROL APPARATUS

(75) Inventors: Yukitoshi Asada, Obu (JP); Naoya Okawa, Obu (JP)

(73) Assignee: Aisan Kogyo Kabushiki Kaisha, Obu (JP)

(*) Notice: Subject to any disclaimer, the term of this patent is extended or adjusted under 35 U.S.C. 154(b) by 75 days.

(21) Appl. No.: 09/990,300

(22) Filed: Nov. 23, 2001

(65) Prior Publication Data

US 2002/0059922 A1 May 23, 2002

(30) Foreign Application Priority Data

Nov. 22, 2000 (JP) ........................................ 2000-355769

(51) Int. Cl.$^7$ .............................................. F02D 41/14
(52) U.S. Cl. ....................................... 123/680; 123/527
(58) Field of Search ................................ 123/527, 528, 123/672, 680; 701/109

(56) References Cited

U.S. PATENT DOCUMENTS

| | | | | |
|---|---|---|---|---|
| 5,337,722 A | * | 8/1994 | Kurihara et al. | ............ 123/527 |
| 5,546,919 A | * | 8/1996 | Iida et al. | .................... 123/682 |
| 5,720,266 A | * | 2/1998 | Nogi et al. | .................. 123/680 |

* cited by examiner

*Primary Examiner*—Tony M. Argenbright
(74) *Attorney, Agent, or Firm*—Oliff & Berridge, PLC

(57) ABSTRACT

LPG decompressed in a regulator is fed as primary fuel into an intake passage from a carburetor, and is fed as supplementary fuel to the intake passage from an injector. An ECU controls a control variable for the injector to cause an air/fuel ratio detected in an oxygen sensor to be a stoichiometric air/fuel ratio. At idle operation, an optimum state of the control variable with respect to a target value is output from a monitor terminal and is monitored, and an adjusting screw in a slow passage is operated and adjusted to cause the control variable to be the target value. An adjustment range for the control variable is set into two stages through operation of the test terminal. The ECU controls an output pattern of a monitor terminal in individual adjustment ranges at each stage, according to whether or not the control variable falls within the adjustment range.

4 Claims, 10 Drawing Sheets

LPG-ENGINE FUEL CONTROL APPARATUS

BACKGROUND OF THE INVENTION

1. Field of the Invention

The present invention relates to an LPG (liquefied petroleum gas) engine using LPG as fuel. Particularly, the present invention relates to a fuel control apparatus for controlling LPG that is to be fed into an LPG engine in an idle operation.

2. Description of the Related Art

Conventionally, there is an LPG engine of the aforementioned type that operates using LPG as fuel which is decompressed by an LPG regulator and which is fed into a carburetor and an injector provided in each intake passage. The LPG regulator decompresses high-pressure LPG from an LPG tank at two steps, and feeds the decompressed LPG through the carburetor into the intake passage as primary fuel according to a venturi vacuum. The LPG regulator also feeds decompressed LPG as supplementary fuel into the injector. On the basis of an air/fuel ratio detected by an oxygen sensor provided in an exhaust passage, a controller feedback-controls the amount of the supplementary fuel that is to be injected from the injector into the intake passage. Specifically, in the LPG engine, the supplementary fuel fed from the injector is added to the primary fuel fed from the carburetor, and the controller controls the feed amount of the supplementary fuel fed from the injector to cause an air/fuel ratio of the two types of fuel and air to be a predetermined stoichiometric air/fuel ratio.

A slow passage is provided in the LPG regulator. In an idle operation of the LPG engine, part (slow fuel) of LPG decompressed by the LPG regulator passes through the slow passage when flowing into the carburetor as the primary fuel. As such, the primary fuel to be fed into the intake passage during the idle operation varies depending on the slow-fuel flow rate.

An adjusting screw is provided in the slow passage. The adjusting screw is operated to adjust the slow-fuel flow rate in order to adjust the air/fuel ratio (idle air/fuel ratio) in the idle operation. During the idle operation, an operator monitors a control variable or a correlation value thereof that has been output from the controller through a measuring instrument, such as a tester, connected to a predetermined monitor terminal. While performing the monitoring, the operator operates the adjustment screw to set the control variable or the like to a predetermined target value. According to the operation, the controller adjusts the idle air/fuel ratio to the predetermined stoichiometric air/fuel ratio. That is, the operator operates the adjustment screw by referencing the tester or the like and monitoring whether the amount of the supplementary fuel fed from the injector is greater or less than a predetermined set value. Through the above operation, the ratio between the primary fuel (slow fuel) and the supplementary fuel that are to be fed into the intake passage at the time of the idle operation is approximated to a predetermined value. Consequently, the idle air/fuel ratio is adjusted to the stoichiometric air/fuel ratio.

FIG. 11 is a graph showing the relationship between the ratio between the primary fuel and the supplementary fuel and an air/fuel ratio A/F. As shown in FIG. 11(a), the primary fuel and the supplementary fuel are fed at a predetermined ratio so as to adjust the air/fuel ratio A/F to the stoichiometric air/fuel ratio. In this particular case, the primary fuel that has been fed from the carburetor and that contributes to the adjustment in the air/fuel ratio A/F on the lean side is up to a predetermined air/fuel ratio (for example, "17"), and the supplementary fuel from the injector is feedback-controlled for the rest. Consequently, the air/fuel ratio A/F can be approximated to the stoichiometric air/fuel ratio. If no change with a lapse of time occurs in the function of the LPG regulator, the above-described relationship is established.

However, with the above-described conventional LPG regulator, a case can occur where, because of change with a lapse of time, tar adheres and accumulates in a gap between the adjustment screw and the slow passage. When tar adheres and accumulates therein, a reduction occurs in slow fuel flowing through the slow passage into the carburetor during the idle operation, thereby causing the idle air/fuel ratio to vary to the lean side. In this case, as shown in FIG. 11(b), the relationship in the ratio between the primary fuel and the supplementary fuel is disordered by the amount of reduction in the primary fuel, and the ratio in which the primary fuel contributes to the air/fuel ratio A/F tends to be lower than "17" on the lean side (lean tendency). For the rest, by increasing the supplementary fuel from a predetermined amount Q1 shown in FIG. 11(a) to a predetermined amount Q2 shown in FIG. 11(b), the idle air/fuel ratio can be approximated to the stoichiometric air/fuel ratio.

However, when the aforementioned condition further proceeds, the primary fuel further decreases, and the supplementary fuel further increases. In this case, since the ratio of the primary fuel is low, the feed amount of the primary fuel needs to be increased, and the feed amount of the supplementary fuel needs to be returned to the predetermined amount Q1. To achieve the above, the slow-fuel flow rate should be adjusted by using the adjustment screw. However, since a primary pressure in the LPG regulator and a venturi vacuum are high, even when the adjustment screw is slightly adjusted, the fuel amount tends to sensitively increase. This causes problems in that adjustment for the idle air/fuel ratio becomes difficult, taking a longer time than required for the adjustment.

The present invention is made in view of the above situation, and has an object to provide an LPG-engine fuel control apparatus that securely adjusts a slow-fuel flow rate in an LPG regulator, thereby enabling an idle air/fuel ratio to be suitably and quickly adjusted.

SUMMARY OF THE INVENTION

To achieve the above described object, there is provided an LPG-engine fuel control apparatus arranged such that LPG decompressed by an LPG regulator is fed as primary fuel into an LPG engine from a carburetor through an intake passage; the LPG decompressed is fed as supplementary fuel for supplementing the primary fuel from supplementary-fuel feeding means into the LPG engine through the intake passage; an air/fuel ratio between the primary fuel and the supplementary fuel and air that are fed is detected by air/fuel-ratio detecting means; the supplementary-fuel feeding means is controlled according to a required control variable to cause the detected air/fuel ratio to be a predetermined stoichiometric air/fuel ratio; and in an idle operation of the LPG engine, an optimum state of the control variable with respect to a predetermined target value is output from monitoring output means and monitored, slow-fuel adjusting means provided in a slow passage of the LPG regulator is operated to cause the control variable to be the target value, and an idle air/fuel ratio is thereby adjusted to the stoichiometric air/fuel ratio, the LPG-engine fuel control apparatus including: range-setting means to be operated to set an adjustment range of the control variable to multistage adjustment ranges each having a different width including the target value; and output control means for controlling an output pattern of the monitoring output means in each of the adjustment ranges set by the range-setting means, according to whether or not the control variable falls within the adjustment range.

According to the above configuration, in the idle operation of the LPG engine, the range-setting means is operated by an operator, and the adjustment range of the control variable is narrowed and set in stages, for example, from a first stage to a subsequent stage. In each of the stages, the state of appropriateness of the control variable with respect to the target value is output from the monitoring output means and is monitored. Through the monitoring, the slow-fuel adjusting means is operated to cause the control variable to be the predetermined target value. At this time, adjustment is performed for the amount of primary fuel that is to be fed from the carburetor into the intake passage, and the control variable for the supplementary-fuel feeding means can be changed to adjust the feed amount of the supplementary fuel according to the adjusted amount of primary fuel. At this stage, the output pattern of the monitoring output means is controlled by the output control means according to whether or not the control variable that changes through operation of the slow-fuel adjusting means falls within the adjustment range that has been set. That is, the output pattern of the monitoring output means can be changed depending on whether or not the control variable falls within the set adjustment range.

As such, in the first stage, the operator is permitted to operate the slow-fuel adjusting means for a coarse adjustment so that the control variable falls within the adjustment range set to be relatively wide. The adjusting operation enables the control variable to approximate substantially to be the target value. In the subsequent stage, the operator operates the slow-fuel adjusting means to finely adjust it in a step-by-step manner so that the control variable falls within the adjustment range set to be gradually narrowed. The adjusting operation causes the control variable already approximated substantially to be the target value to be set step by step to the target value.

DETAILED DESCRIPTION OF THE PREFERRED EMBODIMENTS

Hereinafter, a practical embodiment of an LPG-engine fuel control apparatus (LPG: liquefied petroleum gas) according to the present invention will be described with reference to the drawings.

Figure 1:
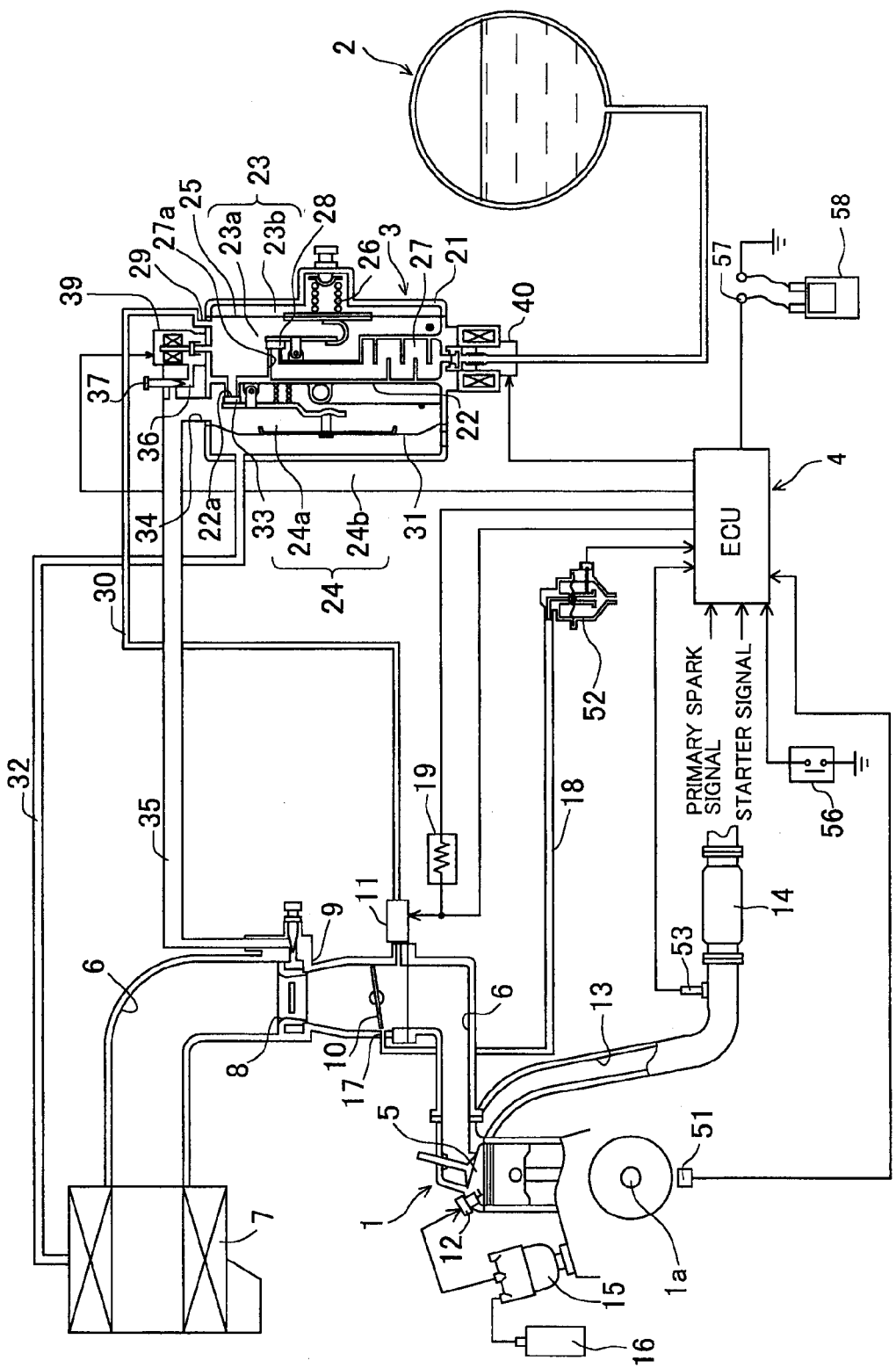
FIG. 1 is a schematic configuration view showing an LPG engine system according to an embodiment.

FIG. 1 shows a schematic configuration view of an LPG engine system according to the present embodiment. The LPG engine system is mounted on a vehicle, and includes an LPG engine 1, an LPG tank 2, an LPG regulator 3, and an electronic control unit (ECU) 4. The LPG engine 1 is a multicylinder internal combustion engine using LPG as fuel. The LPG tank 2 is used to store the LPG in a high-pressure state. The LPG regulator 3 introduces the high-pressure LPG stored in the LPG tank 2, decompresses the LPG, and feeds the decompressed LPG as fuel into the LPG engine 1. The ECU 4 controls the LPG that is fed as fuel into the LPG engine 1.

An intake passage 6 communicating with each combustion chamber 5 is provided in the LPG engine 1. An air cleaner 7 is provided on the side on an entry of the intake passage 6. A carburetor 9 including a venturi 8 is provided midway of the intake passage 6. A throttle valve 10 is provided downstream of the carburetor 9. The throttle valve 10 performs open/close operations in synchronization with operation of accelerator operating means (not shown), such as an accelerator pedal. The throttle valve 10 adjusts the amount of air (amount of intake air) drawn inside from the air cleaner 7 into each of the combustion chambers 5 via the intake passage 6. An injector 11 is provided downstream of the throttle valve 10. The injector 11 forms supplementary-fuel feeding means and injects the fuel. In the LPG engine 1, spark plugs 12 are provided corresponding to the combustion chambers 5. In addition, an exhaust passage 13 communicating with the corresponding combustion chambers 5 is provided in the LPG engine 1. An exhaust-gas purging catalyst converter 14 is provided midway of the exhaust passage 13.

An ignition coil 16 is connected to each of the spark plugs 12 via a distributor 15. The distributor 15 receives a high voltage that has been output from the ignition coils 16, and distributes ignition signals to the individual spark plugs 12.

The inside of a casing 21 of the LPG regulator 3 is partitioned by an isolating wall 22 into a primary chamber 23 and a secondary chamber 24. The primary chamber 23 is partitioned by a primary diaphragm 25 into a primary decompression chamber 23a and an atmospheric pressure chamber 23b. The primary diaphragm 25 moves according to the balance between the pressure in the primary decompression chamber 23a and an urging force of a spring 26 provided in the atmospheric pressure chamber 23b. A high-pressure LPG is introduced from the LPG tank into a high-pressure passage 27 provided on the isolating wall 22. A primary valve 28 is provided in a primary port 27a through which the high-pressure passage 27 communicates with the primary decompression chamber 23a. The primary valve 28 is formed to perform open/close operations in response to the movement of the primary diaphragm 25. A supplementary-fuel port 29 is provided in the primary decompression chamber 23a. The supplementary-fuel port 29 is connected to a supplementary-fuel passage 30 that communicates with the injector 11.

The secondary chamber 24 is partitioned by a secondary diaphragm 31 into a secondary decompression chamber 24a and an atmospheric pressure chamber 24b. The atmospheric pressure chamber 24b is connected to one end of an atmospheric pressure passage 32 that communicates with the air cleaner 7. The secondary diaphragm 31 moves according to the balance between the pressure in the secondary decompression chamber 24a and the pressure of ambient air introduced into the atmospheric pressure chamber 24b through the atmospheric pressure passage 32. A secondary valve 33 is provided in a communicating port 22a provided on the isolating wall 22 between the primary decompression chamber 23a and the secondary reductive-pressure chamber 24a. The secondary valve 33 is configured to perform open/close operations in response to the movement of the secondary diaphragm 31. A primary-fuel port 34 is provided in the secondary decompression chamber 24a. A primary-fuel passage 35 communicating with the carburetor 9 is connected to the primary-fuel port 34.

Figure 2:
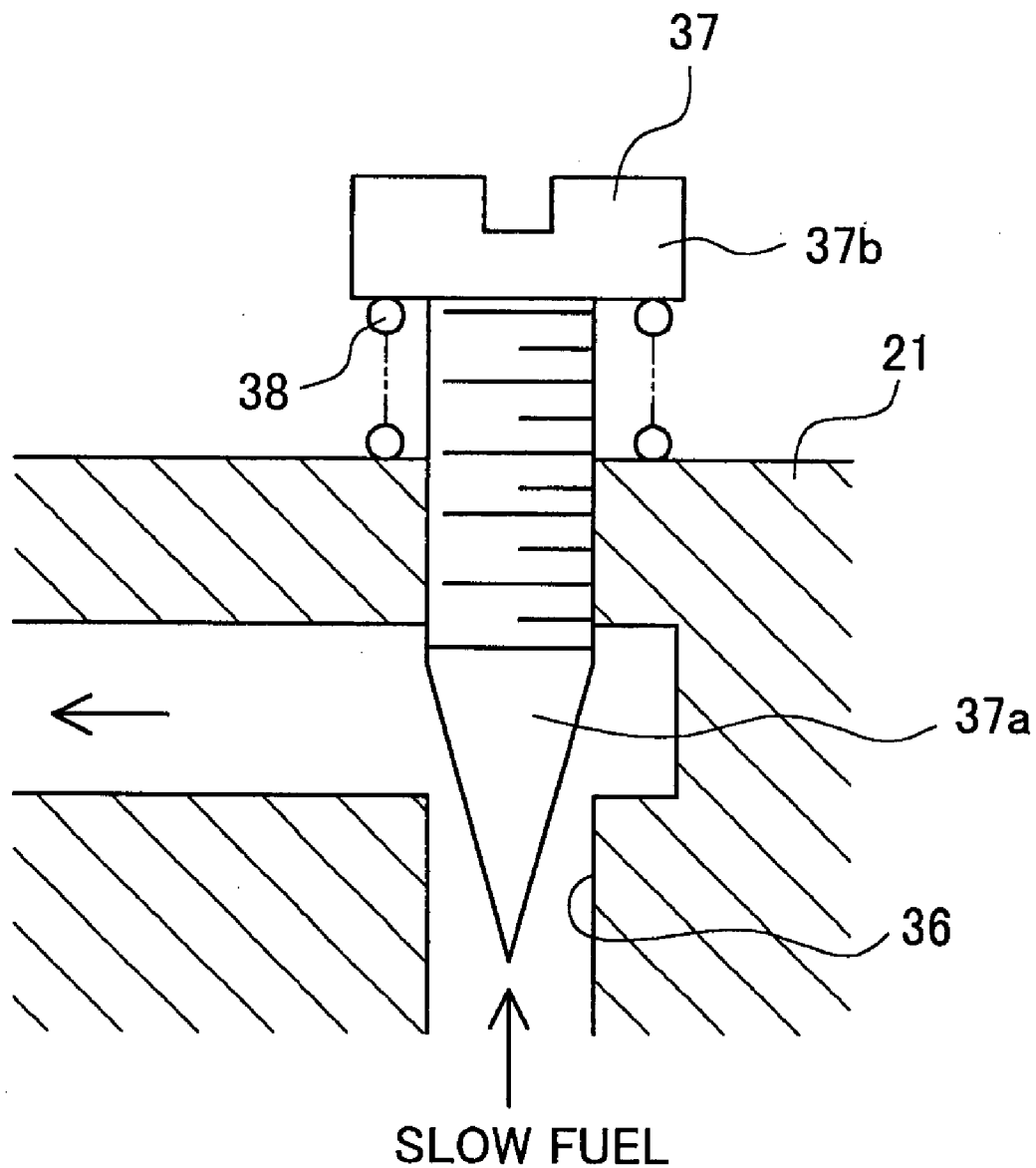
FIG. 2 is a cross sectional view showing a slow passage and an adjusting screw.

A slow passage 36 is provided between the primary decompression chamber 23a and the primary-fuel passage 35. In an idle operation, the slow passage 36 passes LPG as slow fuel flowing from the primary decompression chamber 23a into the carburetor 9 through the primary-fuel passage 35. In the slow passage 36, an adjusting screw 37 is provided as a slow-fuel adjusting means for adjusting the slow-fuel flow rate for the idle operation. The adjusting screw 37 includes a needle 37a at the end thereof, as shown in FIG. 2. A leaping compression spring 38 is interposed between a head 37b of the adjusting screw 37 and the casing 21. Through the adjustment for the amount of engagement of the adjusting screw 37 with the casing 21, the passage area between the needle 37a and the slow passage 36 is adjusted. Consequently, the slow-fuel flow rate in the slow passage 36 is adjusted.

As shown in FIG. 1, a slow-fuel shut-off valve 39 is provided in the slow passage 36. The slow-fuel shut-off valve 39 is formed of an electromagnetic valve for stopping the flow of slow fuel. At a decelerated operation of the LPG engine 1, the slow-fuel shut-off valve 39 is closed to momentarily shut off the slow fuel flowing into the carburetor 9. A primary-fuel shut-off valve 40 is provided to an entry of the high-pressure passage 27. The primary-fuel shut-off valve 40 is formed of an electromagnetic valve for shutting off high-pressure LPG flowing from the LPG tank 2. The primary-fuel shut-off valve 40 is forcedly closed when, for example, the LPG engine 1 is stopped.

At the time of an intermediate-load operation of the LPG engine 1, ambient air is drawn into the intake passage 6 through the air cleaner 7. At the time of an ambient-air intake operation, LPG secondarily decompressed in the LPG regulator 3 is led to flow as primary fuel into the carburetor 9 through the primary-fuel passage 35. The air is led to flow according to a venturi vacuum created in the venturi 8. Then, the LPG is fed into the intake passages 6. For an idle operation of the LPG engine 1, part of LPG (slow fuel) primarily decompressed in the LPG regulator 3 passes through the slow passage 36. The slow fuel then flows into the carburetor 9 through the primary-fuel passage 35, and it is fed into the intake passage 6. Through the intake passage 6, together with ambient air, the fuel is drawn into each of the combustion chambers 5. The intake amount of the primary fuel into each of the combustion chambers 5 is determined according to the opening of the throttle valve 10.

Similarly, at operation of the LPG engine 1, the injection time of the injector 11 is controlled based on a valve open time. According to the control, supplementary fuel for supporting the primary fuel is fed into the intake passage 6, and the feed amount thereof is adjusted. Specifically, according to the control of the injection time of the injector 11, LPG primarily decompressed in the primary decompression chamber 23a of the LPG regulator 3 is fed into the injector 11 through the supplementary-fuel passage 30 to supplement the primary fuel that is to be fed into the intake passage 6. Thus, the LPG to be used as the supplementary fuel is injected into the intake passage 6. Consequently, together with the primary fuel and air, the supplementary fuel is fed into each of the combustion chambers 5.

In the above-described LPG engine 1, in the operation thereof, in response to the activation of each of the spark plugs 12, explosion/combustion occurs with a mixture gas of primary fuel, supplementary fuel, and air that has been drawn into each of the combustion chambers 5. Consequently, a drive force can be obtained in the LPG engine 1. Postcombustion exhaust gases are discharged from the individual combustion chambers 5 to the exhaust passage 13, are purified in the catalyst converter 14, and are then discharged to the outside.

A rotation speed sensor 51 provided in the LPG engine 1 detects the rotation speed of a crankshaft 1a as engine speed, and outputs a signal corresponding to a detected value. A vacuum switch 52 is provided in the LPG engine 1 to detect an idle operation event in which the throttle valve 10 is almost fully closed. Through a vacuum port 17 and a vacuum pipe 18, the vacuum switch 52 introduces an intake vacuum generated near the throttle valve 10 in the idle operation event, and outputs an idle signal in response to the vacuum. An oxygen sensor 53 provided to the exhaust passage 13 detects an oxygen concentration of exhaust gases discharged from each of the individual combustion chambers 5, and outputs a signal corresponding to a detected value. The oxygen sensor 53 detects an air/fuel ratio of mixture gas that is to be fed from the intake passage 6 into each of the combustion chambers 5.

The ECU 4 inputs various signals that are output from, for example, the rotation speed sensor 51, the vacuum switch 52, and the oxygen sensor 53. The ECU 4 inputs a start signal from a starter (not shown) used for cranking operations in the LPG engine 1 and a primary spark signal generated with the ignition coil 16. According to the input signals, the ECU 4 controls, for example, the injector 11, the slow-fuel shut-off valve 39, and the primary-fuel shut-off valve 40, to execute control, such as fuel control including air-fuel-ratio control. A register 19 is connected between the ECU 4 and the injector 11 to hold control signals issued from the ECU 4. In this case, the ECU 4 corresponds to air-fuel-ratio control means of the present invention. The ECU 4 outputs a required control variable, and controls the injector 11 to cause the air/fuel ratio to be a predetermined stoichiometric air/fuel ratio.

As is well known, the ECU 4 is formed to include a microcomputer. The microcomputer is configured to include a central control unit (CPU), a read only memory (ROM), a random access memory (RAM), a backup RAM, an external input circuit, and an external output circuit. In the ECU 4, the CPU, the ROM, the RAM, and the backup RAM are connected through a bus to the components including the external input circuit and the external output circuit. The ECU 4 thus configured functions as a logic circuit. In the ROM, predetermined control programs are preliminarily stored. In the RAM, a computational result by the CPU is temporarily stored. In the backup RAM, preliminary stored data is preserved. According to predetermined control programs, the CPU executes the aforementioned types of control in response to various signals input from the various sensors 51 to 53 via an input circuit.

In the present embodiment, an operator adjusts the air/fuel ratio (idle air/fuel ratio) for the idle operation. To build a configuration that permits an operator to perform the adjustment, the present embodiment includes one test terminal 56 and one monitor terminal 57 that are individually connected to the ECU 4. The monitor terminal 57 corresponds to monitoring output means of the present invention. The monitor terminal 57 monitors a monitor voltage VF indicating the appropriateness of an injection time TINJ as a control variable that is output from the ECU 4 to the injector 11. The appropriateness of the injection time TINJ is monitored in value with respect to a predetermined target value.

Figure 3:
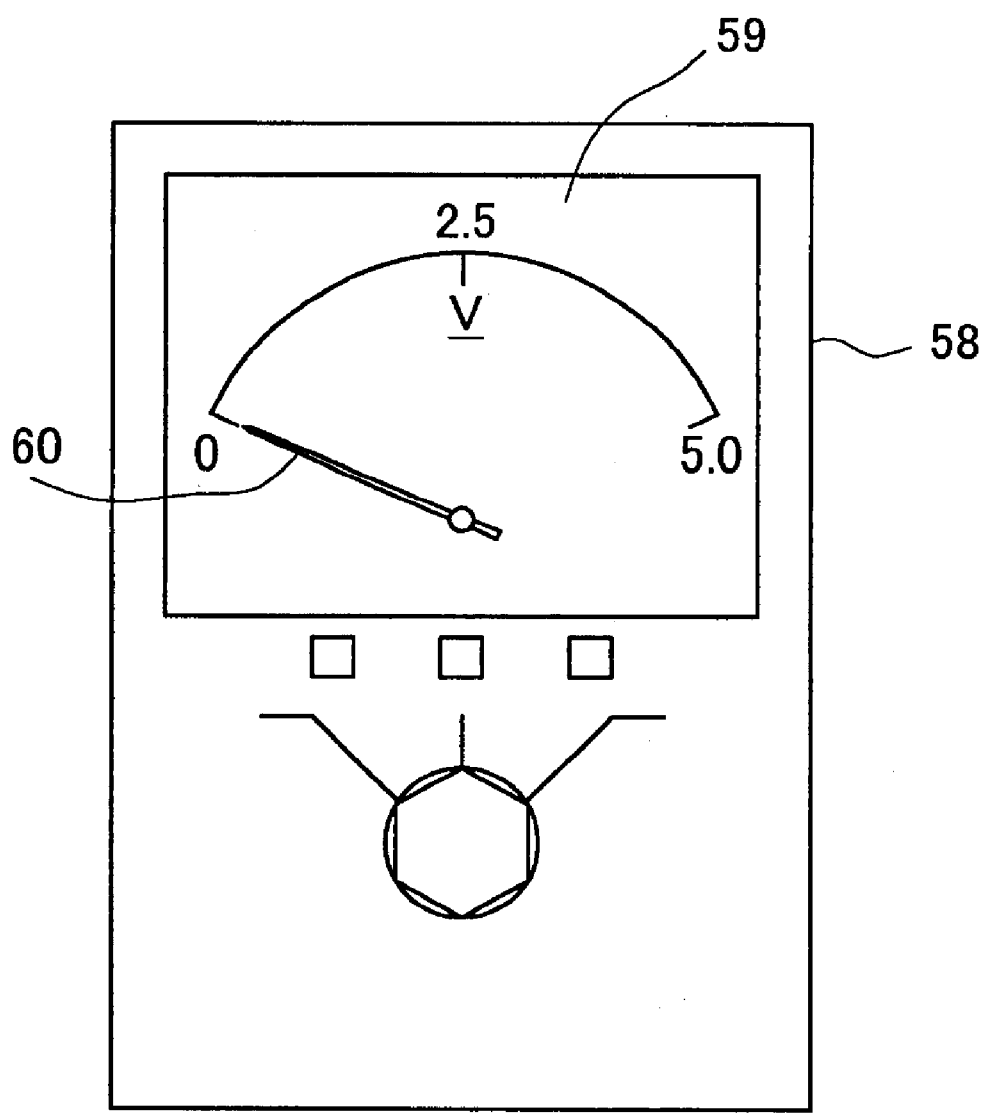
FIG. 3 is a front view showing a tester.

In the present embodiment, the monitor terminal 57 is optionally connected to a commercially available tester 58 used as a measuring instrument. FIG. 3 shows an example of the tester 58 that analogously indicates direct currents in a range of from "0V" to "5.0V". An indicator 59 of the tester 58 indicates the graduation divisions of "0V", "2.5V", and "5.0V", and the gradation divisions are to be pointed by a pointer 60. A voltmeter may be used for the tester 58.

In the present embodiment, in the idle operation of the LPG engine 1, the monitor voltage VF that is output from the monitor terminal 57 according to the ECU 4 is indicated on the tester 58, and is monitored by the operator. The operator operates and adjusts the adjusting screw 37 to cause the value of the monitor voltage VF to be a predetermined value. Consequently, the idle air/fuel ratio is adjusted to a stoichiometric air/fuel ratio.

Figure 4:
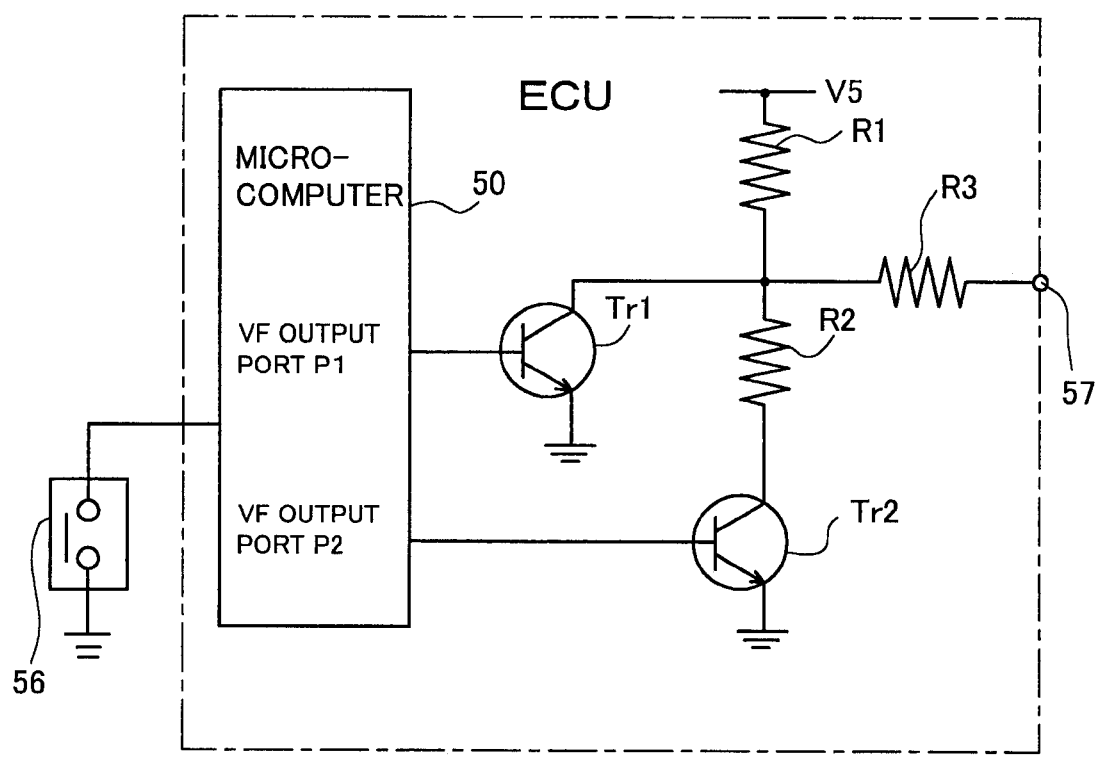
FIG. 4 is an electrical circuit diagram of an electronic control unit (ECU) related to a test terminal and a monitor terminal.

FIG. 4 is an electrical circuit diagram representing the ECU 4 configuration related to the test terminal 56 and the monitor terminal 57. The base of a first transistor Tr1 is coupled to a VF output port P1 of a microcomputer 50, and a second transistor Tr2 is coupled to another VF output port P2 of the microcomputer 50. One terminal of a series-coupled pair of resistors R1 and R2 is coupled to the collector of the second transistor Tr2, and the other terminal is coupled to a power source (5 V). The collector of the first transistor Tr1 is coupled between the resistors R1 and R2, and is further coupled to the monitor terminal 57 via another resistor R3.

In the configuration described above, the test terminal 56 corresponds to range-setting means of the present invention. The test terminal 56 is operated to set the adjustment range of the value of the monitor voltage VF to adjustment ranges of multiple stages. The individual adjustment ranges at each stage have a different width including the aforementioned target value. In the present embodiment, the range-setting means allows two stages to be set, one of which is an initial stage defined as a "first stage", and other one is a subsequent stage defined as a "second stage".

Figure 5:
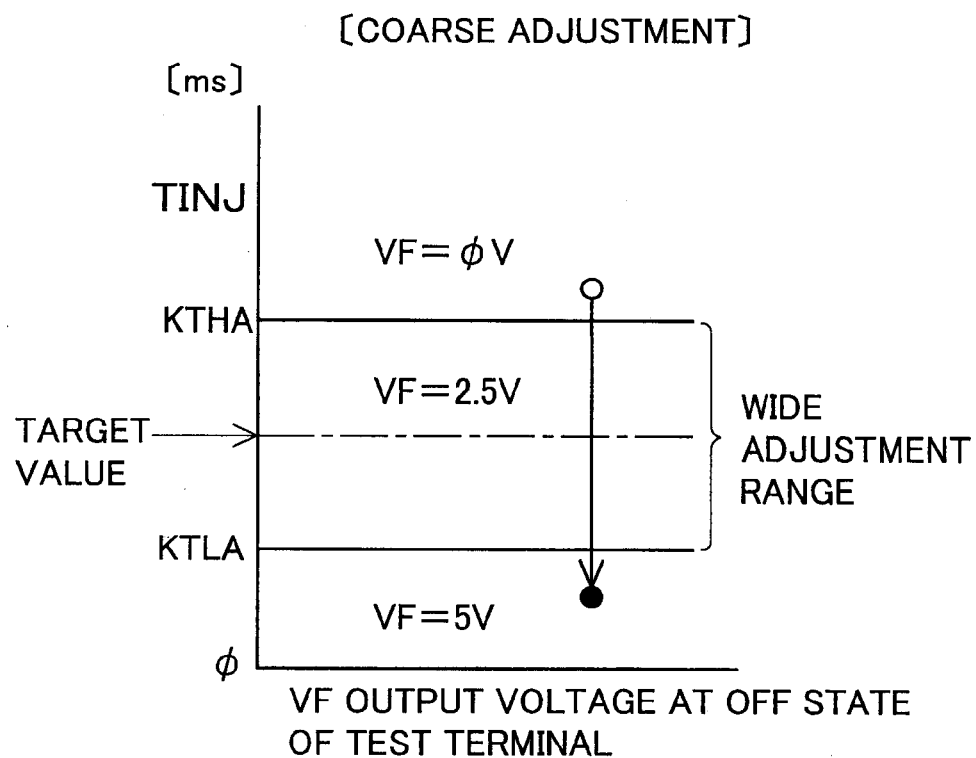
FIG. 5 is a graph showing the relationship between an injection time TINJ and a monitor voltage VF.

In more specific, when the test terminal 56 is in an OFF state, a relatively wide adjustment range is set as the first stage. In this case, the indication state of the indicator 59 of the tester 58 can be changed. The change is implemented such that the ECU 4 (microcomputer 50) controls the pattern of an output of the monitor terminal 57 according to whether the control variable falls within the wide adjustment range. FIG. 5 is a graph showing the relationship between the injection time TINJ set as a control variable when the test terminal 56 is in an OFF state and the monitor voltage VF. In the present embodiment, when the test terminal 56 is in the OFF state, the ECU 4 adjusts the adjustment range of the injection time TINJ including the predetermined target value to the range between a first upper limit value KTHA and a first lower limit value KTLA. In addition, the ECU 4 controls the first and second transistors Tr1 and Tr2 to control the monitor voltage VF. When a mean injection time TAV representing a mean value of injection times TINJ is greater than or equal to the first upper limit value KTHA, the ECU 4 controls the monitor voltage VF to be "0V". In addition, when the mean injection time TAV falls within the range between the first upper limit value KTHA and the first lower limit value KTLA, the ECU 4 controls the monitor voltage VF to be "2.5V". Similarly, when the mean injection time TAV is less than the first lower limit value KTLA, the ECU 4 controls the monitor voltage VF to be "5.0V". The ECU 4 that executes the above-described control corresponds to a first output control means of the present invention.

Figure 6:
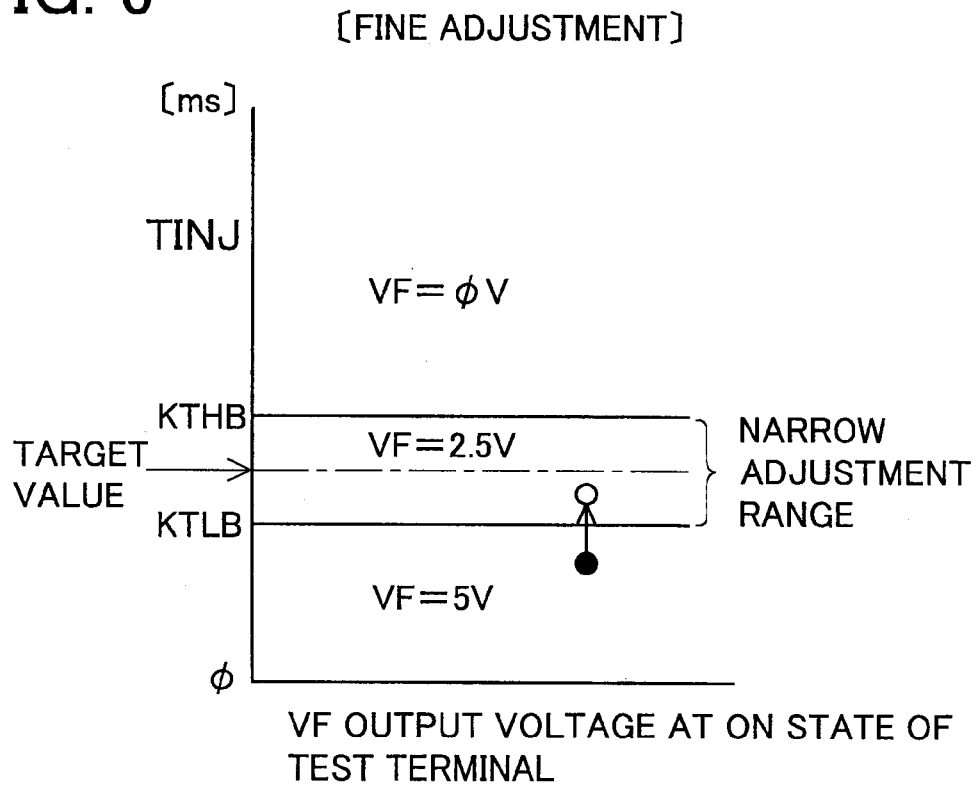
FIG. 6 is a graph showing the relationship between the injection time TINJ and the monitor voltage VF.

In contrast, when the test terminal 56 is in an ON state, a relatively narrow adjustment range is set as the second stage. In this case, the indication state of the indicator 59 of the tester 58 can be changed. The change is implemented such that the ECU 4 (microcomputer 50) controls the output pattern of the monitor terminal 57 according to whether the control variable falls within the narrow adjustment range. FIG. 6 is a graph showing the relationship between the injection time TINJ when the test terminal 56 is in an ON state and the monitor voltage VF. In the present embodiment, when the test terminal 56 is in the ON state, the ECU 4 adjusts the adjustment range of the injection time TINJ including the predetermined target value to the range between a second upper limit value KTHB and a second lower limit value KTLB (the values are related as "KTHA>KTHB>KTLB>KTLA 22 0"). In addition, the ECU 4 controls the first and second transistors Tr1 and Tr2 to control the monitor voltage VF. In specific, when the mean injection time TAV is greater than or equal to the second upper limit value KTHB, the ECU 4 controls the monitor voltage VF to be "0V". When the mean injection time TAV falls within the range between the second upper limit value KTHB and the second lower limit value KTLB, the ECU 4 controls the monitor voltage VF to be "2.5V". When the mean injection time TAV is lower than the second lower limit value KTLB, the ECU 4 controls the monitor voltage VF to be "5.0V". The ECU 4 that executes the above-described control corresponds to a second output control means of the present invention.

Hereafter, the contents of a fuel control processing that includes output control of the above-described monitor voltage VF will be described in detail.

Figure 7:
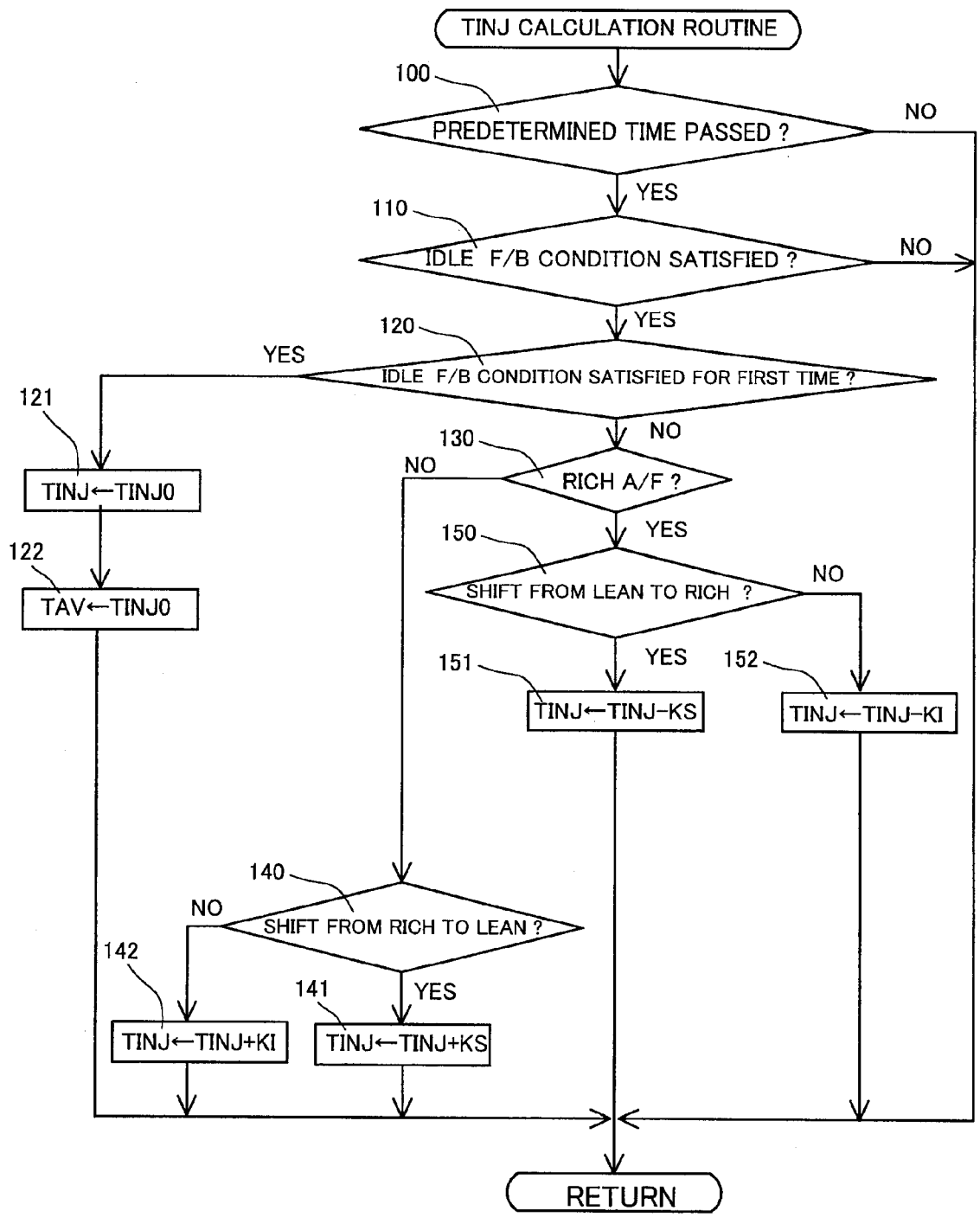
FIG. 7 is a flowchart showing a TINJ calculating routine.

FIG. 7 is a flowchart showing a calculating routine for the injection time TINJ. This calculating program is preliminarily stored in the ROM of the microcomputer 50 in the ECU 4. The microcomputer 50 (CPU) periodically executes the program at predetermined time intervals.

In specific, the microcomputer 50 determines whether a predetermined time (for example, "10 ms") has passed after a start time. If the determination result is negative, the microcomputer 50 controls processing to once terminate. If the determination result is affirmative, the processing proceeds to Step 110.

At Step 110, the microcomputer 50 determines whether an idle feedback (F/B) condition has been satisfied. The idle F/B condition is, for example, a condition in which a predetermined engine speed is detected by the rotation speed sensor 51, a fully closed state of the throttle valve 10 (idle state) is detected by the vacuum switch 52, and a warm-up-completion required time of the oxygen sensor 53 has passed. When the determination result is negative, the microcomputer 50 controls processing to once terminate. When the determination result is affirmative, the processing proceeds to Step 120.

At Step 120, the microcomputer 50 determines whether the idle F/B condition is satisfied for the first time. If the determination result is affirmative, the microcomputer 50 controls processing to proceed to Step 121, and sets the injection time TINJ to an initial value TINJ0. Then, at Step 122, the microcomputer 50 sets the mean injection time TAV to the initial value TINJ0, and controls processing to terminate. On the other hand, if the determination result is negative, the microcomputer 50 controls processing to proceed to Step 130.

At Step 130, according to a detected value obtained by the oxygen sensor 53, the microcomputer 50 determines whether an air/fuel ratio A/F of a mixture gas to be fed into the LPG engine 1 is rich. If the microcomputer 50 has determined the air/fuel ratio A/F to be not rich (that is, to be lean), it controls processing to proceed to Step 140.

At Step 140, the microcomputer 50 determines whether a shift from rich to lean has occurred. If the determination result is affirmative, at Step 141 the microcomputer 50 adds a skip offset value KS to the value of the injection time TINJ. Consequently, the addition result is produced as a new value of the injection time TINJ. Then, the microcomputer 50 once terminates processing. At the aforementioned Step 140, if the determination result is negative, the microcomputer 50 adds an integration offset value KI to the value of the injection time TINJ. Consequently, the addition result is produced as a new value of the injection time TINJ. Then, processing once terminates.

At the aforementioned Step 130, if the microcomputer 50 determines the air/fuel ratio A/F to be rich, it controls processing to proceed to Step 150. At Step 150, the microcomputer 50 determines whether a shift from lean to rich has occurred. If the determination result is affirmative, at Step 151 the microcomputer 50 performs subtracts a skip offset value KS from the value of the injection time TINJ. Consequently, the subtraction value is produced as a new value of the injection time TINJ. Then, processing once terminates. At the aforementioned Step 150, if the determination result is negative, the microcomputer 50 subtracts an integration offset value KI from the value of the injection time TINJ. Accordingly, the subtraction value is produced as a new value of the injection time TINJ. Then, processing once terminates.

Figure 8:
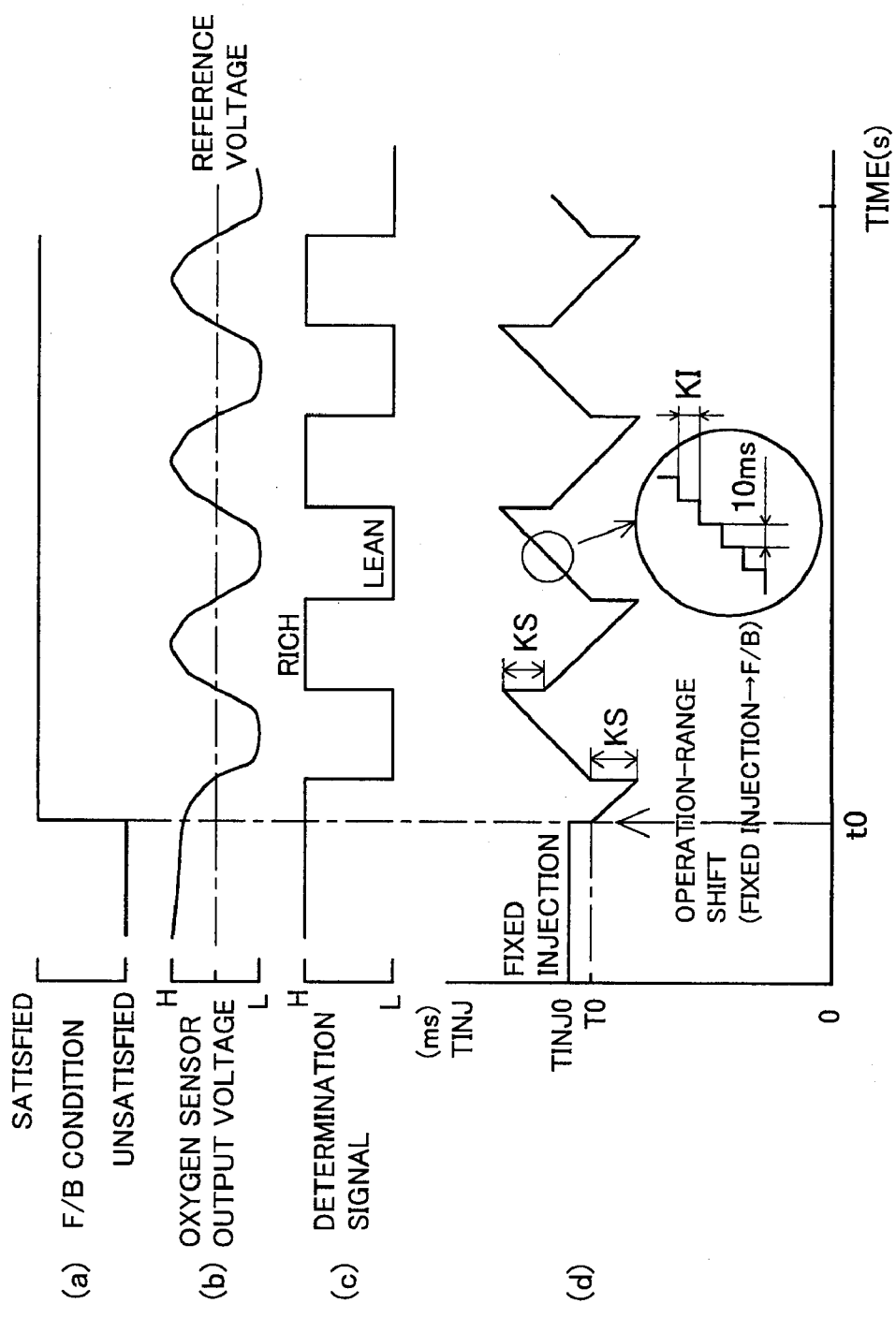
FIG. 8 is a timing chart showing the behavior of various parameters.

The injection times TINJ are calculated in the above manners. FIGS. 8(*a*) to (*d*) represent the behavior of various parameters related to the calculations of the injection times TINJ. FIG. 8(*a*) represents a case where a feedback (F/B) condition is satisfied at time T0. In this case, as shown in FIG. 8(*b*), an output voltage of the oxygen sensor 53 varies with respect to a reference voltage; and as shown in FIG. 8(*c*), a rich/lean determination signal is obtained. Corresponding to the rich, lean, shift from rich to lean, and shift from lean to rich, the skip offset values KS or integration offset values KI are individually added to or subtracted to/from the initial value TINJ0. Consequently, the values of injection times TINJ are obtained.

However, as shown in FIG. 8(*d*), periodical variations are involved in the values of injection times TINJ that can be obtained in feedback control. As such, with the values as obtained being simply referenced, effective injection times TINJ for adjusting the idle air/fuel ratio cannot be obtained. To solve the problem, in the present embodiment the mean injection time TAV is obtained by averaging (smoothing) the injection times TINJ.

Figure 9:
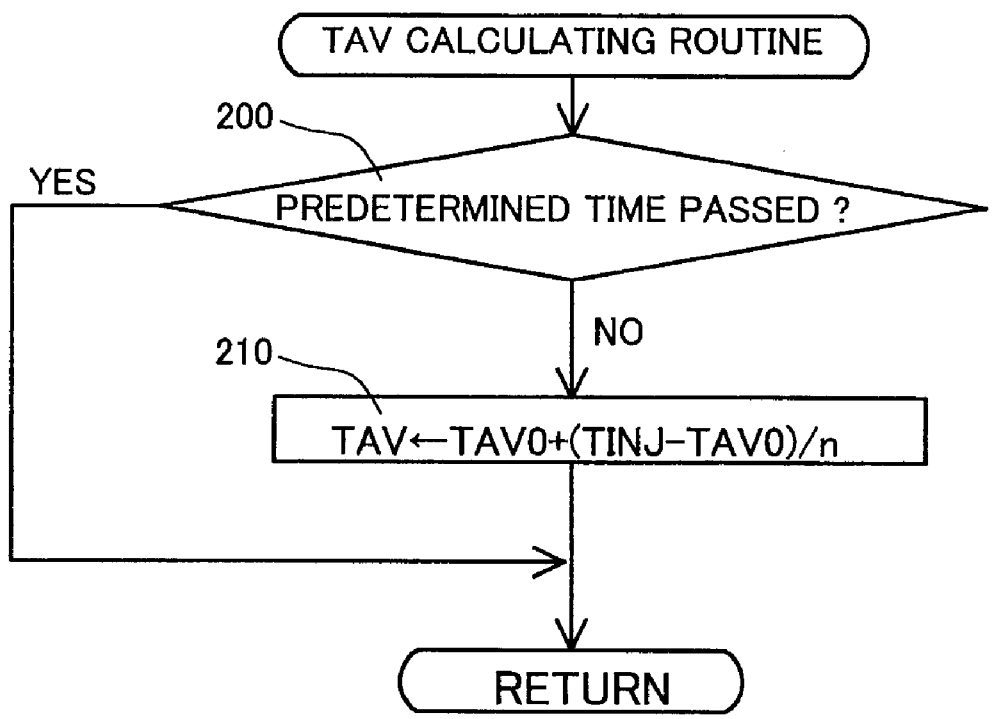
FIG. 9 is a flowchart showing a TAV calculating routine.

FIG. 9 is a flowchart showing a calculating routine of the mean injection time TAV. This calculating program is preliminarily stored in the ROM of the microcomputer 50. The microcomputer 50 (CPU) periodically executes the program at predetermined time ("50 ms" for example) intervals.

In specific, at Step 200, the microcomputer 50 determines whether a predetermined time ("50 ms" for example) has passed after a reference time. If the determination result is negative, the microcomputer 50 performs averaging processing (smoothing processing) for the injection times TINJ, and controls the processing to once terminate. In this case, the microcomputer 50 calculates the mean injection time TAV according to the following Expression (1):

$$TAV \leftarrow TAV0+(TINJ-TAV0)/n \quad (1)$$

where, "TAV0" represents a previous mean injection time, "n" represents a natural number (for example, "8" is assigned).

At the aforementioned Step 200, if the determination result is affirmative, then the microcomputer 50 once terminates the subsequent processing.

Figure 10:
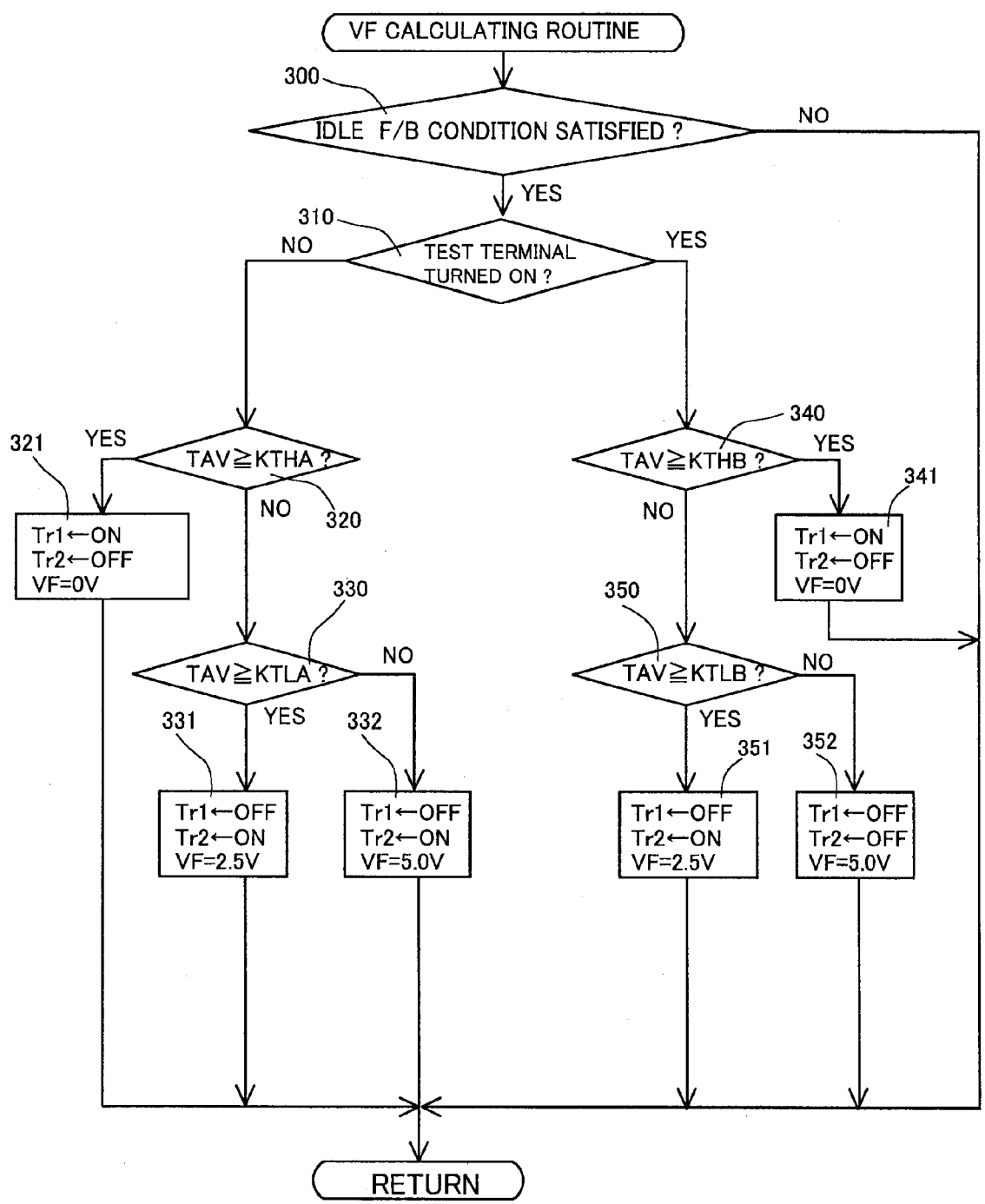
FIG. 10 is a flowchart showing a VF calculating routine.
Figure 11:
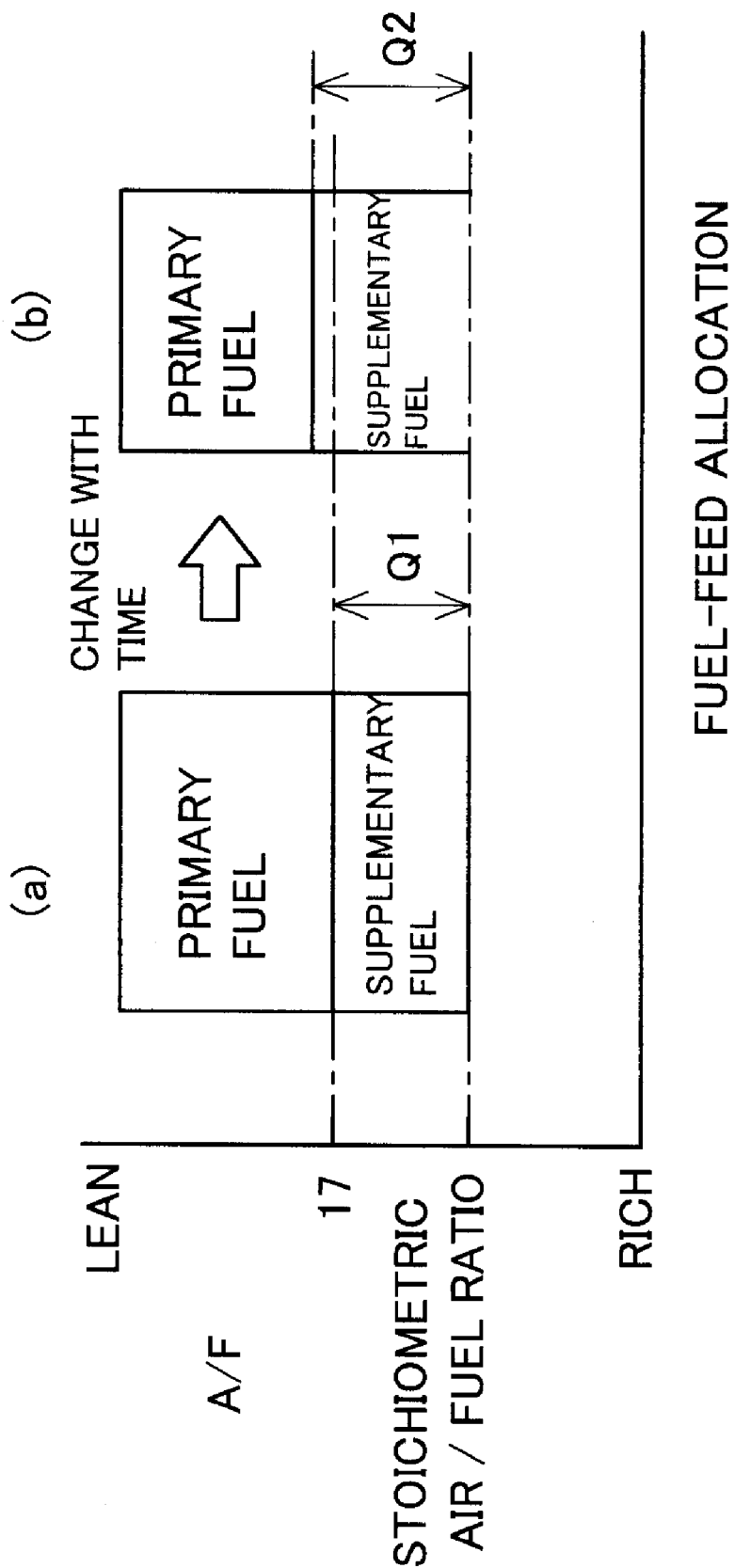
FIG. 11 is an explanatory view showing a ratio between primary fuel and supplementary fuel with respect to an air/fuel ratio in a conventional example.

According to a value of the mean injection time TAV obtained as above, the microcomputer 50 performs the control of the output pattern of the monitor voltage VF. The monitor voltage VF depends on whether the value of each of the injection times TINJ falls within the individual adjustment ranges set step by step, as shown in FIGS. 5 and 6. The aforementioned control is implemented as described hereafter. FIG. 10 is a flowchart of a calculating routine for the monitor voltages VF. This calculating program is preliminarily stored in the ROM of the microcomputer 50. The microcomputer 50 (CPU) executes the program at predetermined time intervals.

At Step 300, the microcomputer 50 determines whether an idle F/B condition has been satisfied. The idle F/B condition is the same as that in Step 110 of "TINJ calculating routine" shown in FIG. 7. If the determination result is negative, the microcomputer 50 controls the processing to terminate. If the determination result is affirmative, the microcomputer 50 controls processing to proceed to Step 310.

At Step 310, the microcomputer 50 determines whether the test terminal 56 is turned ON. If the test terminal 56 is not turned ON, that is, if the test terminal 56 is set to the OFF state in which the relatively wide range is set, as shown in FIG. 5, the microcomputer 50 controls processing to proceed to Step 320.

At Step 320, the microcomputer 50 determines whether the value of the mean injection time TAV that has been calculated this time is greater than or equal to the first upper limit value KTHA. If the determination result is affirmative, at Step 321 the microcomputer 50 controls the first transistor Tr1 to turn ON and controls the second transistor Tr2 to turn OFF. Consequently, the monitor voltage VF is set to "0V". On the other hand, at Step 320, if the determination result is negative, the microcomputer 50 controls processing to proceed to Step 330.

At Step 330, the microcomputer 50 determines whether the value of the mean injection time TAV that has been calculated this time is greater than or equal to the first lower limit value KTLA. If the determination result is affirmative, the microcomputer 50 controls the first transistor Tr1 to turn OFF at Step 331. Concurrently, the microcomputer 50 controls the second transistor Tr2 to turn ON, thereby setting the monitor voltage VF to "2.5V". On the other hand, at the aforementioned Step 330, if the determination result is negative, the microcomputer 50 controls both the first and second transistors Tr1 and Tr2 to turn OFF. Consequently, the monitor voltage VF is set to "5.0V".

At the aforementioned Step 310, if the test terminal 56 is turned ON, that is, the test terminal 56 is set to the ON state where the relatively narrow adjustment range is set, as shown in FIG. 6, the microcomputer 50 controls processing to proceed to Step 340.

At Step 340, the microcomputer 50 determines whether the value of the mean injection time TAV that has been calculated this time is greater than or equal to the second upper limit value KTHB. If the determination result is affirmative, at Step 341 the microcomputer 50 controls the first transistor Tr1 to turn ON. Concurrently, the microcomputer 50 controls the second transistor Tr2 to turn OFF, thereby setting the monitor voltage VF to "0V". On the other hand, at the aforementioned Step 340, if the determination result is negative, the microcomputer 50 controls processing to proceed to Step 350.

At the aforementioned Step 350, the microcomputer 50 determines whether the value of the mean injection time TAV that has been calculated this time is greater than or equal to the second lower limit value KTLB. If the determination result is affirmative, the microcomputer 50 controls the first transistor Tr1 to turn OFF at Step 351. Concurrently, the microcomputer 50 controls the second transistor Tr2 to turn ON, thereby setting the monitor voltage VF to "2.5V". On the other hand, at the aforementioned Step 350, if the determination result is negative, the microcomputer 50 controls both the first and second transistors Tr1 and Tr2 to turn OFF. Consequently, the monitor voltage VF is set to "5.0V".

The monitor voltages VF are calculated in the above manners. In addition, according to the ON/OFF state of the test terminal 56, as shown in FIGS. 5 and 6, the adjustment range of the injection time TINJ (mean injection time TAV) is set step by step. This enables the change to be implemented for the output pattern of the monitor voltage VF that represents the state of appropriateness of the injection time TINJ with respect to the adjustment range.

As described above, according to the LPG-engine fuel control apparatus of the present embodiment, the operator first connects the tester 58 to the monitor terminal 57. Then, the LPG engine 1 is idle-operated, and the operator selectively operates the test terminal 56. Accordingly, the adjustment range of the injection time TINJ, which is a control variable of the injector 11, is narrowed in stages, for example, from the first stage to the second stage. At each of the set stages, the monitor voltage VF representing the state of appropriateness of the injection time TINJ with respect to the predetermined target value is output from the monitor terminal 57. Concurrently, the output is displayed on the indicator 59. By monitoring the monitor voltage VF, the operator operates the adjusting screw 37 of the LPG regulator 3 to adjust the injection time TINJ to the predetermined target value. The operation is thus performed to adjust the amount of primary fuel that is to be fed from the carburetor 9 to the intake passage 6 through the slow passage 36. Consequently, the ECU 4 adjusts the injection time TINJ that is to be output to the injector 11 to adjust the feed amount of the supplementary fuel flowing into the intake passage 6 according to the adjustment for the primary fuel.

As shown in FIG. 5, the relatively wide adjustment range defined with the first upper limit value KTHA and the first lower limit value KTLA is set in the first stage, and the adjusting screw 37 is operated for adjustment in the first stage. Consequently, according to the condition as to whether the injection time TINJ that is to be adjusted by the ECU 4 falls in the wide adjustment range, the ECU 4 controls the pattern of the output from the monitor terminal 57. That is, the output pattern of the monitor voltage VF from the monitor terminal 57 can be changed depending on whether or not the injection time TINJ falls within the wide adjustment range that has been set. In specific, with reference to FIG. 5, when the injection time TINJ does not fall within the adjustment range, the "0V" or "5.0V" monitor voltage VF is output. However, when the injection time TINJ falls within the adjustment range, the "2.5V" monitor voltage VF is output.

As such, in the first stage, the operator is permitted to coarsely adjust the adjusting screw 37 so that the injection time TINJ falls within the adjustment range set relatively wide; that is, the operator is permitted to perform a coarse adjustment. The coarse adjustment enables the injection time TINJ to approximate substantially to be the target value.

Subsequently, when the test terminal 56 is turned ON, the relatively narrow adjustment range defined with the second upper limit value KTHB and the second lower limit value KTLB is set in the second stage, as shown in FIG. 6. In the second stage, the adjusting screw 37 is finely adjusted. According to the condition as to whether the injection time TINJ that is to be adjusted by the ECU 4 falls within the narrow adjustment range, the ECU 4 controls the pattern of the output from the monitor terminal 57. That is, the output pattern of the monitor voltage VF can be changed depending on whether or not the injection time TINJ falls within the narrow adjustment range that has been set. In specific, with reference to FIG. 6, when the injection time TINJ does not fall within the adjustment range, the "0V" or "5.0V" monitor voltage VF is output. However, when the injection time TINJ falls within the adjustment range, the "2.5V" monitor voltage VF is output.

As such, in the second stage, the operator performs a fine adjustment of the adjusting screw 37 so that the injection time TINJ falls within the adjustment range set narrower than that in the first stage. According to the fine adjustment, the injection time TINJ already approximated substantially to be the target value is adjusted step by step to the target value.

As described above, through the switching operation performed for the monitor terminal 57, in the first stage, the coarse adjustment by the operator for the adjusting screw 37 enables the injection time TINJ to approximate substantially to be the target value. In the second stage, according to the fine adjustment by the operator, the injection time TINJ already approximated substantially to be the target value is finally adjusted to the target value. As such, although the adjusting screw 37 is sensitive, the slow-fuel flow rate in the LPG regulator 3 can be securely adjusted step by step, and the idle air/fuel ratio can be suitably and quickly adjusted.

In the present embodiment, the injection time TINJ is adjusted in two stages, i.e., the first and second stages. That is, the present embodiment employs the multistage adjustment method in which the adjustment is implemented in minimum steps and time. This enables the operator to carry out the adjustment in the simplest manner and shortest time.

The present invention is not limited to the above-described embodiment, and it can be implemented as described below without departing from the spirit and scope of the invention.

(1) While the test terminal 56 is used as the range-setting means in the above-described embodiment, a dedicated switch that is different from the test terminal may be provided. Alternatively, the arrangement may be made such that the adjustment range is switched in response to a load variation occurring when a brake switch operates and a brake lamp turns on in connection with a brake-pedal operation.

(2) In the above-described embodiment, the monitor terminal 57 is provided as the monitoring output means, and the ECU 4 provided as the output control means switches the output pattern of the monitor voltage VF in the monitor terminal 57 among "0V", "2.5V", and "5.0V". The arrangement may be modified such that a plurality of LEDs (light emitting devices) or lamps are provided as monitoring output means, the output pattern is determined according to a variation in, for example, selective flashing conditions or the number of flashing conditions thereof, and the output pattern is controlled by the ECU provided as the output control means. Alternatively, the arrangement may be modified such that a single LED or the like is provided as the output control means, an on/off pattern of the LED or the like is used as the output pattern, and the output pattern is controlled therewith. In these arrangements, the LED or the like is preferably pre-provided at an easy-to-view portion, for example, a portion near an LPG regulator, to enable the adjustment to be performed without using a dedicated measuring instrument such as a tester.

(3) In the above-described embodiment, the injection time TINJ is adjusted in two stages, namely, the first and second stages. However, for example, three or four stages may be employed for the adjustment. In this case, two or more test terminals 56 may be employed as the range-setting means for setting the adjustment range of the injection time TINJ in multiple stages.

(4) While the injector 11 is provided as the supplementary-fuel feeding means in the above-described embodiment, a stepper-motor-driven actuator valve may be used as the supplementary-fuel feeding means to replace the injector.

Since the present invention is configured as described above, it provides the following advantages. The slow-fuel flow rate in the LPG regulator can be securely adjusted. Accordingly, the idle air/fuel ratio of the LPG engine can be suitably and quickly adjusted.

What is claimed is:

1. An LPG-engine fuel control apparatus arranged such that LPG decompressed by an LPG regulator is fed as primary fuel into an LPG engine from a carburetor through an intake passage; the LPG decompressed is fed as supplementary fuel for supplementing the primary fuel from supplementary-fuel feeding means into the LPG engine through the intake passage; an air/fuel ratio between the primary fuel and the supplementary fuel and air that are fed is detected by air/fuel-ratio detecting means; the supplementary-fuel feeding means is controlled according to a required control variable to cause the detected air/fuel ratio to be a predetermined stoichiometric air/fuel ratio; and in an idle operation of the LPG engine, an optimum state of the control variable with respect to a predetermined target value is output from monitoring output means and monitored, slow-fuel adjusting means provided in a slow passage of the LPG regulator is operated to cause the control variable to be the target value, and an idle air/fuel ratio is thereby adjusted to the stoichiometric air/fuel ratio, the LPG-engine fuel control apparatus including:

range-setting means to be operated to set an adjustment range of the control variable to multistage adjustment ranges each having a different width including the target value; and output control means for controlling an output pattern of the monitoring output means in each of the adjustment ranges set by the range-setting means, according to whether or not the control variable falls within the adjustment range.

2. The LPG-engine fuel control apparatus according to claim 1, wherein the range-setting means enables the setting of the adjustment range of the control variable to be switched between two stages for a relatively wide range and a relatively narrow range.

3. An LPG-engine fuel control apparatus including:

a carburetor including a venturi provided in an intake passage of an LPG engine;

an LPG regulator that decompresses high-pressure LPG at two steps, that feeds secondarily-decompressed LPG as primary fuel from the carburetor into the intake passage according to a venturi vacuum during an intermediate-load operation of the LPG engine, and that feeds part of primarily-decompressed LPG as primary fuel from the carburetor into the intake passage through a slow passage during an idle operation of the LPG engine;

slow-fuel adjusting means that is operated to adjust an LPG flow rate in the slow passage;

supplementary-fuel feeding means that feeds the primarily-decompressed LPG as supplementary fuel into the intake passage to supplement the primary fuel fed into the intake passage and that is controlled to adjust the feed amount thereof;

air/fuel-ratio detecting means for detecting an air/fuel ratio between the primary fuel and the supplementary fuel and air that are fed from the intake passage into the LPG engine;

air/fuel-ratio control means for controlling the supplementary-fuel feeding means by outputting a predetermined control variable to cause the detected air/fuel ratio to be a predetermined stoichiometric air/fuel ratio; and monitoring output means for monitoring an optimum state of the control variable with respect to a predetermined target value, wherein in an idle operation of the LPG engine, the state of appropriateness of the control variable output from the monitoring output means is monitored, the slow-fuel adjusting means is operated to cause the control variable to be the target value, and an idle air/fuel ratio is thereby adjusted to the stoichiometric air/fuel ratio, the LPG-engine fuel control apparatus further including:

range-setting means to be operated to set an adjustment range of the control variable to multistage adjustment ranges each having a different width including the target value;

first output control means for controlling an output pattern of the monitoring output means according to whether or not the control variable falls within a wide adjustment range when the wide adjustment range is set by the range-setting means; and second output control means for controlling an output pattern of the monitoring output means according to whether or not the control variable falls within a narrow adjustment range when the narrow adjustment range is set by the range-setting means.

4. The LPG-engine fuel control apparatus according to claim 3, wherein the range-setting means enables the setting of the adjustment range of the control variable to be switched between two stages for a relatively wide range and a relatively narrow range.

* * * * *